May 15, 1945.　　K. E. SCHONERT ET AL　　2,376,280
LOCKING MOUNT
Filed July 21, 1943　　2 Sheets-Sheet 2
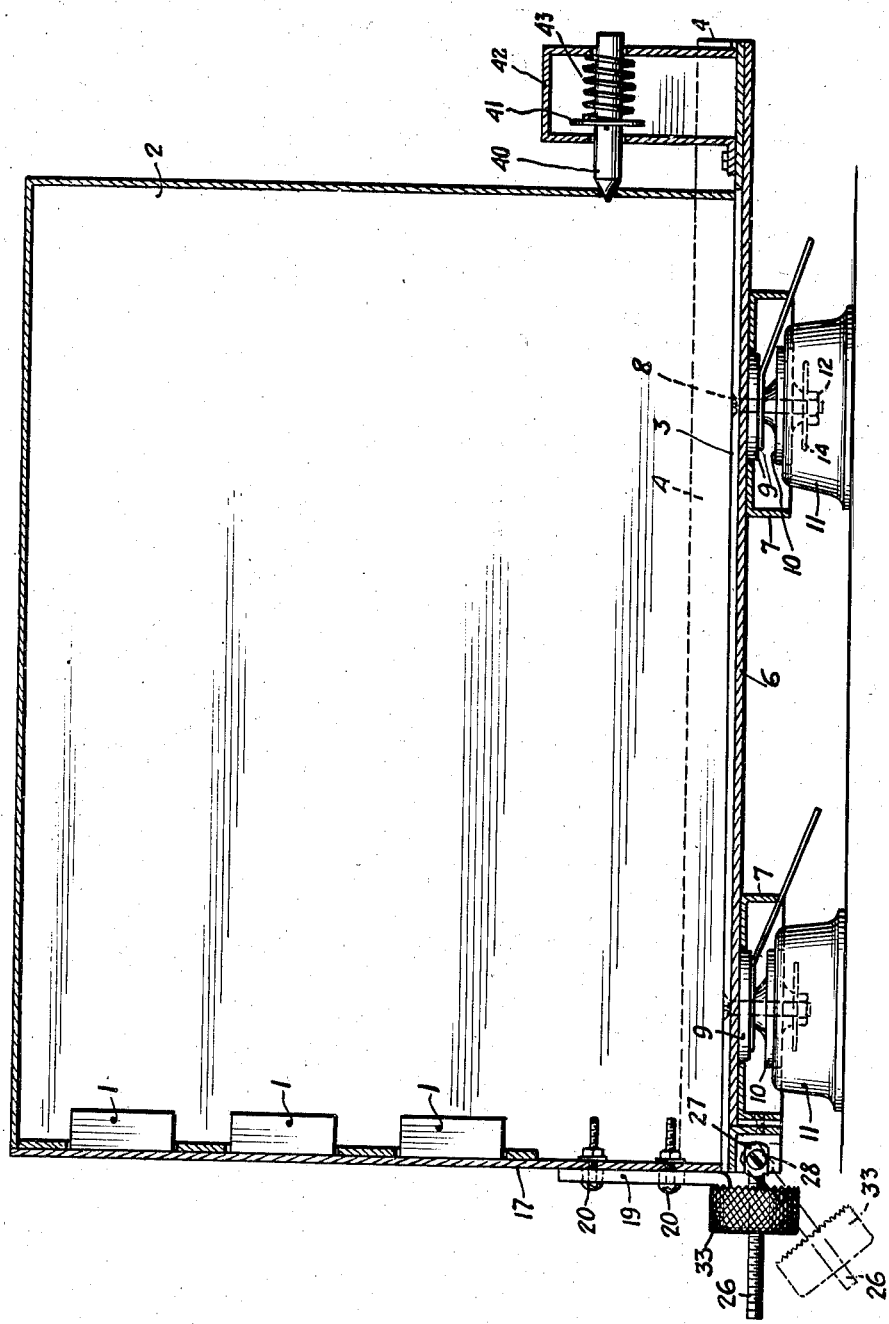
INVENTORS
Koester E. Schonert
BY Willard C. Hatfield
Mock & Blum
ATTORNEYS Patented May 15, 1945

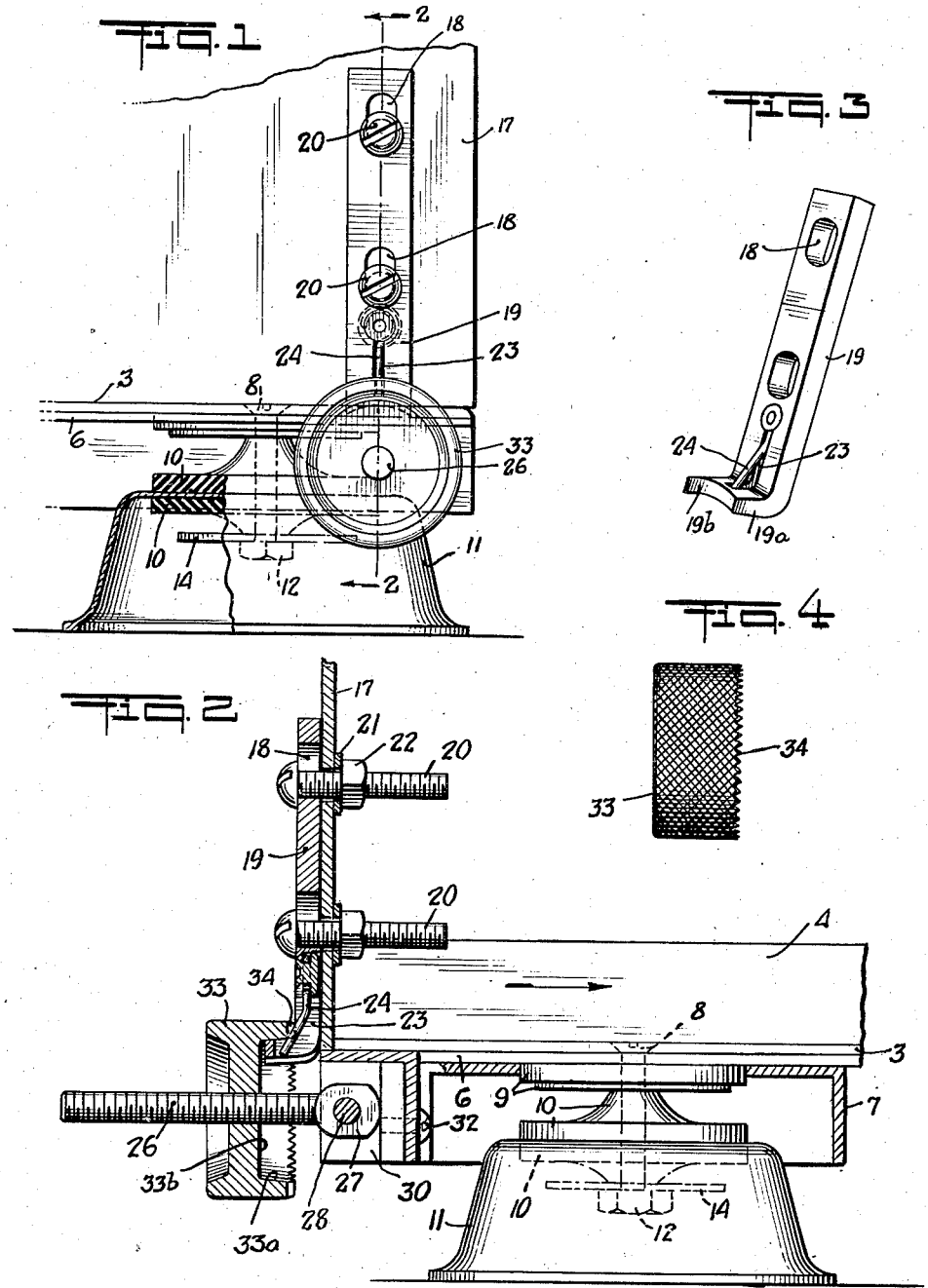

2,376,280

UNITED STATES PATENT OFFICE 2,376,280

LOCKING MOUNT

Koester E. Schonert and Willard C. Hatfield, Stamford, Conn., assignors to Airadio Incorporated, Stamford, Conn., a corporation of Connecticut Application July 21, 1943, Serial No. 495,618

3 Claims. (Cl. 151—41)

Our invention relates to a new and improved locking-mount.

One of the objects of our invention is to provide a locking-mount for radio accessories, electronic accessories, and other devices, especially for use with vehicular equipment, in order to protect such devices from shock and vibration, and to hold the chassis of such devices securely in position.

Another object of our invention is to provide simple and efficient locking-means for locking the chassis of such devices in position.

Another object of our invention is to provide an improved locking device which is automatically held in locked position, and which can be easily unlocked.

Other objects of our invention are stated in the annexed description and drawings, which illustrate a preferred embodiment thereof. Our invention is illustrated in said embodiment, as applied to the well-known "ATR" mount, which has been extensively used for mounting radio accessories and electronic accessories on vehicular equipment.

Fig. 1 is a front end elevation of a part of the improved device.

Fig. 2 is a section on the line 2—2 of Fig. 1.

Fig. 3 is a perspective view of the angle member which is one of the elements of the improved device.

Fig. 4 is an elevation of the nut which is one of the elements of the improved device.

Fig. 5 is a vertical longitudinal section, partially in elevation, which shows the improved devices applied to an "ATR" mount.

The instruments or devices 1 are mounted in a housing or chassis 2.

Said chassis 2 is slidably supported on the horizontal flanges 3 of angular rails, which have vertical flanges 4. These horizontal flanges 3 constitute slide-supports for the chassis 2. Said chassis 2 fits snugly and slidably between the vertical flanges 4. For convenience, it is assumed that said supporting flanges 3 are horizontal and that the flanges 4 are vertical, although the device is operative in any position.

The bottom faces of said flanges 3 abut the top face of a frame or plate 6.

As shown in Figs. 2 and 5, the bottom planar face of said frame 6 abuts the planar top faces of the top walls of rigid channel members 7, which have a U-shaped cross-section. Bolts 8, whose upper flared ends are counter-sunk in flanges 3, pass through respective vertically alined bores which are provided in said flanges 3 and said frame 6, through rigid washers 9 and 14, through resilient washers 10 and through the top walls of rigid supporting cups 11. These cups 11 rest upon any suitable supporting base. The resilient washers 10 overlap the edge of the bores in the flat top walls of the respective cups 11. The head 12 of each bolt 8 abuts the respective rigid washer 14, which abuts the bottom of the bottom washer 10.

The resilient washers 10, which can be made of rubber or the like, have central resilient bosses, as shown in Figs. 2 and 5.

At the rear of the casing or chassis 2, the respective flanges 3 are provided with respective fixed housings 42. Each housing 42 has perforated front and rear walls, in which a plunger 40 is slidably mounted. Each plunger 40 fits snugly and slidably in the bores of said walls of its housing 42. Each plunger 40 has a front tapered end, which enters a respective bore in the rear vertical wall of chassis 2. Each plunger 40 is biased forwardly by a compression spring 43, whose front end abuts a respective plate 41, which is fixed to the respective plunger 40.

Each plate 41 acts as a stop for the respective plunger 40, when the chassis 2 is off the rails. In such case, each stop plate 41 abuts the rear face of the front wall of the respective housing 42.

Each plunger 40 is longitudinally alined with an angular clamping arm 19, which is fixed to the front wall 17 of the chassis 2, in a vertical position. Each said clamping arm 19 has a plurality of vertically elongated holes 18. The height of each hole 18 exceeds its width. The holes 18 of each clamping arm 19 are alined with respective holes in said front wall 17. The shanks of clamping screws 20 pass through the respective pairs of alined holes of each clamping arm 19 and of front wall 17. Each clamping screw 20 is provided with a lock washer 21 and a clamping nut 22.

The heads of clamping screws 20 are wider than holes 18. Hence each clamping arm 19 can be clamped in adjusted vertical position relative to front wall 17.

Each clamping arm 19 is provided with a foot 19a, which is inclined downwardly and forwardly relative to the vertical body of said arm 19. The top wall of said food 19a is a frusto-conical shape, in order to interfit with the frusto-conical wall 33a, which is later described. The foot 19a is of uniform length and width, and it has a flat end-wall 19b, whose upper edge is convex and whose lower edge is concave.

At its lower end, as shown in Figs. 2 and 3, an angular through-and-through slot 23 is provided in each angular arm 19. Said angular slot 23 extends into the foot 19a of said arm 19.

Said slot 23 is closed at each end thereof. The upper end of a bent spring 24 is fixed to each arm 19, at the upper end of slot 23. The lower end of spring 24 is unattached to foot 19a, so that said lower end can move back and forth in the respective part of slot 23.

As shown in Fig. 2, each angular arm 19 is associated with a pivoted locking arm 26, whose shank has an external thread. Each locking arm 26 has a rear head 27, which is pivotally connected by pivot pin 28 to an angular plate 30, a web of which is fixed by a screw 32 to a depending lug of frame 6.

A nut locking device 33, whose rear annular face is provided with teeth or serrations 34, has a tapped bore, by means of which said nut 33 is turnably mounted on the threaded shank of the respective locking arm 26.

As shown in Fig. 2, each said nut 33 has an internal frusto-conical wall 33a at its rear end. The front or inner end of said frusto-conical wall 33a is of smaller diameter or width than its rear outer end. When each nut 33 is in the position shown in Fig. 2, for example, said frusto-conical wall 33a interfits with the top frusto-conical wall of foot 19a, as previously stated. When wall 33a so interfits with said top wall of 19a, nut 33 can be freely turned. Nut 33 can be turned so as to move it rearwardly on its locking arm 26, until the planar transverse internal wall 33b of nut 33 abuts the end-wall 19b of foot 19a. If nut 33 is now further turned as to move it rearwardly, it exerts a rearward pressure upon the respective arm 19, thus forcing the chassis 2 rearwardly.

Hence the pressure of the locking nuts 33 is taken up wholly by the arms 19, and no pressure is imposed upon the springs 24.

Each said spring 24 meshes with the tapered teeth 34, when walls 33b and 19b abut each other. The springs 24 and the teeth 34 can intermesh, before said walls 33b and 19b abut.

Each spring 24 then acts as a yieldable detent, to hold the respective nut 33 against turning, unless sufficient force is exerted on said nut. When spring 24 thus intermeshes with teeth 34, the free lower end of spring 24 moves longitudinally back and forth when nut 33 is turned to move said nut either forwardly or rearwards.

When the nut 33 clears foot 19a, the locking arm 26 of said nut, with the nut assembled on such arm 26, can be turned downwardly to the inoperative position shown in broken lines in Fig. 5, in order to clear the front ends of the rails. The chassis 2 can then be slid on or off the rails.

When the locking arms 26 are in said inoperative positions, the chassis 2 can be slid rearwardly on the rails until the tapered ends of the plungers 40 partially enter the bores in the rear wall of chassis 2.

The locking arms 26 are then turned to operative positions, and then nuts 33 are turned to move said nuts rearwardly.

As soon as walls 33b and 19b abut each other, the further rearward longitudinal movement of nuts 33 slides the chassis rearwardly, thus moving plungers 40 rearwardly and compressing the biasing springs 43. The conical heads of plungers 40 exert downward pressure upon the rear wall of the chassis.

The slope of the top walls of feet 19a may be equal to, or slightly greater than, the slope of walls 33a. The nuts 33a thus exert downward pressure upon feet 19a and upon the front wall of the chassis 2.

When the nuts 33 are in final locking position, the chassis 2 is held against longitudinal movement and upward movement, relative to the rails. The springs 24 hold the nuts 33 in such final locking position.

We have described a preferred embodiment of our invention, but it is clear that numerous changes and omissions and additions can be made without departing from its scope.

We claim:

1. For use in combination with a slide support for a casing, said slide support having means at its rear end for holding the rear of the casing against rearward movement relative to said slide support, a bar attached to the front wall of said casing, said attached bar having a forwardly and downwardly projecting foot which extends in front of said slide support, a locking bar pivotally connected at its rear end to said slide support, said locking bar being externally threaded, a nut turnably mounted on said threaded locking bar, said locking bar being turnable to a position in which said nut clears the front end of said foot, the rear end-part of said nut having an internal frusto-conical wall whose front inner end is of smaller diameter than its rear outer end, said nut being movable on said locking bar to a position in which said frusto-conical wall abuts a transverse wall of said foot, yieldable detent means fixed to said attached bar and associated with said nut and adapted to hold the nut in abutment with said transverse wall of said foot, said nut exerting a rearward thrust directly against said attached bar when said nut is moved rearwardly on said locking bar.

2. A nut locking device which comprises, a bar, said bar having a body and a foot which is inclined downwardly and forwardly relative to said body, said foot having a longitudinal slot which extends into said body so that said slot is of longitudinal angular shape, a spring, a part of said spring being fixed to said body, a part of said spring being located in said slot of said foot and being freely movable back-and-forth in said slot of said foot, a part of said spring extending forwardly of said body for engagement with ratchet teeth on a nut.

3. A device according to claim 2, in which said foot has an outer wall shaped substantially like a portion of a frusto-conical wall, whose narrow end is located adjacent the tip of said foot.

KOESTER E. SCHONERT.
WILLARD C. HATFIELD.